(12) United States Patent
Stovall

(10) Patent No.: US 7,832,855 B2
(45) Date of Patent: Nov. 16, 2010

(54) TEMPLE-BAR-LESS EYEGLASSES

(76) Inventor: Robert Stovall, 1035 Vista Grande, Millbrae, CA (US) 94030

( * ) Notice: Subject to any disclaimer, the term of this patent is extended or adjusted under 35 U.S.C. 154(b) by 0 days.

(21) Appl. No.: 12/390,459

(22) Filed: Feb. 21, 2009

(65) Prior Publication Data

US 2010/0214530 A1 Aug. 26, 2010

(51) Int. Cl.
 G02C 3/00 (2006.01)
 G02C 1/02 (2006.01)
 G02C 5/16 (2006.01)
(52) U.S. Cl. .................. 351/156; 351/110; 351/111; 351/114
(58) Field of Classification Search .................. 351/156, 351/110, 157, 111, 41, 158, 114
See application file for complete search history.

(56) References Cited

U.S. PATENT DOCUMENTS

| 5,541,676 A * | 7/1996 | Pallat | 351/156 |
| 2009/0174861 A1 * | 7/2009 | Perie | 351/110 |

* cited by examiner

Primary Examiner—Hung X Dang
(74) Attorney, Agent, or Firm—Clarke A. Wixon

(57) ABSTRACT

Temple-bar-less eyeglasses eliminate the temple bars, ear pieces, and hinges of traditional eyeglasses in favor of a flexible tether system attaching to the lenses of the eyeglasses, which sits atop the wearer's ears and connects behind the wearer's head. The temple-bar-less eyeglasses are comfortable, light in weight, resistant to damage and breakage, and customizable as desired by the wearer.

15 Claims, 3 Drawing Sheets

TEMPLE-BAR-LESS EYEGLASSES

FIELD OF THE INVENTION

The invention relates to eyeglasses, and more particularly to corrective or ornamental eyeglasses having no temple bars.

BACKGROUND OF THE INVENTION

Eyeglasses, or spectacles, are often worn to refractively correct the wearer's vision, or to protect the wearer's eyes against physical hazards or damaging radiation (e.g., bright or ultraviolet light). Sometimes, eyeglasses are worn simply for aesthetic purposes. As common and fundamental as eyeglasses are, traditional eyeglasses have not changed much in hundreds of years.

Eyeglasses are usually rather heavy, with frames and components made of metal. For example, a pair of frameless (specifically, rimless) traditional eyeglasses 110 is depicted in FIG. 1. As shown, the traditional eyeglasses 110 have two temple bars 112 and 114, each connected to one of two lenses 116 and 118 through hinges 120 and 122, respectively. The two lenses 116 and 118 are connected to each other through a nose bridge 124.

The temple bars 112 and 114, the hinges 120 and 122, and the nose bridge 124 are often made from metal, though some traditional eyeglasses (especially those with plastic frames around the lenses) use metal-reinforced plastics for some of those components.

The metal pieces are relatively heavy, and a significant amount of pressure is exerted on the wearer's nose (through a pair of nose pads 126) and ears (through the temple bars 112 and 114). Moreover, many metals (including, for example, aluminum) are somewhat reactive and tend to corrode in the presence of normal skin secretions—this may also irritate the wearer's skin. Accordingly, the metal components in many traditional eyeglasses 110 are often coated with a less reactive polymer.

This construction is relatively complex and expensive. The metals used in eyeglass components tend not to be relatively inexpensive commodity materials such as aluminum (light but brittle and reactive) or stainless steel (heavier but less reactive), but rather special flexible metal materials engineered to have better performance with respect to bending. Specifically, shape memory alloys have been developed that tend to spring back into their original shape after having been bent. These alloys (such as FLEXON® from Marchon Eyewear, TITANFLEX® from Eschenbach Optik, and others) have improved flexibility characteristics in comparison to other metals, but share some of the same limitations, especially weight and expense. These materials are particularly difficult to work with in manufacturing.

Traditional eyeglass construction also has some limitations deriving from their physical configuration, regardless of materials. The temple bars are subject to bending and breakage because of the lengthy shape. The temple bars place a significant amount of stress on the hinges, which may also be subject to breakage. In turn, the hinges may cause the temple bars to press against the wearer's head, causing some discomfort. This is true to some extent even with modern spring hinges, which are capable of bending past the usual 90-degree limit.

Traditional eyeglasses are not especially compact, and are subject to increased risk of breakage when stored. Generally, for storage, the temple bars 112 and 114 are folded (via the hinges 120 and 122) across the rear of the lenses 116 and 118. Although storage cases are often provided, many eyeglass wearers simply drop their glasses into a purse, bag, or pocket. Even when great care is taken, maintenance and repair is often needed—screws in the hinges 120 and 122 often work their way out over the course of time, and are frequently lost. When such screws are lost, either of the temple bars 112 and 114 may detach from the eyeglasses 110, preventing the eyeglasses from being worn until the screws are replaced.

Small children are also often attracted to eyeglasses, and often grab and handle glasses worn by a caregiver or found within reach. This is another common source of breakage.

Folding glasses have been made that incorporate additional hinges into the temple bars and the nose bridge. Because of the additional hinges, these folding glasses are often heavier, more expensive, and less stylish than traditional eyeglasses.

The mechanical components in traditional eyeglasses also complicate the matter of fitting the glasses to each wearer. Generally, the temple bars 112 and 114 are bent and configured to fit the wearer's head, and distal ear pieces 128 and 130 are also adjusted to permit the glasses to maintain a desired position on the wearer's head with minimal slippage. These adjustments are complex and best performed by trained and licensed opticians. If a pair of traditional eyeglasses is bent or otherwise damaged, which can be a relatively frequent occurrence, the eyeglasses may remain uncomfortable (or at worst, unwearable) until an optician is able to repair and readjust them.

With traditional eyeglasses having borne the same general configuration for nearly three hundred years, and marginal improvements having been made to some materials and components, clearly there is a need for an improved eyeglass design that improves upon and eliminates many of the aforementioned limitations. Such improved eyeglasses would be of lighter weight, relatively inexpensive, non-reactive to the wearer's skin, and resistant to breakage or falling out of adjustment. And preferably, such eyeglasses would be stylish and desirable to those who wear glasses for primarily (or even secondarily) aesthetic purposes.

SUMMARY OF THE INVENTION

Temple-bar-less eyeglasses according to the present invention improve upon traditional eyeglasses in several key respects.

The eyeglasses described and claimed herein have a temple-bar-less design. The temple bars and ear pieces are eliminated in favor of a flexible tether system that attaches to the lenses of the eyeglasses, sits atop the wearer's ears, and connects behind the wearer's head.

The tether system is light in weight, flexible, and highly resistant to damage or breakage. And because the tether system is flexible, it can be adjusted once for the wearer when the glasses are dispensed by an optician, and subsequently will retain their comfort even after being stored.

Components of temple-bar-less eyeglasses are customizable and may be easily ornamented to the desires and whims of the wearer.

BRIEF DESCRIPTION OF THE DRAWINGS

These and other objects, features, and advantages of the invention will become apparent from the detailed description below and the accompanying drawings, in which.

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
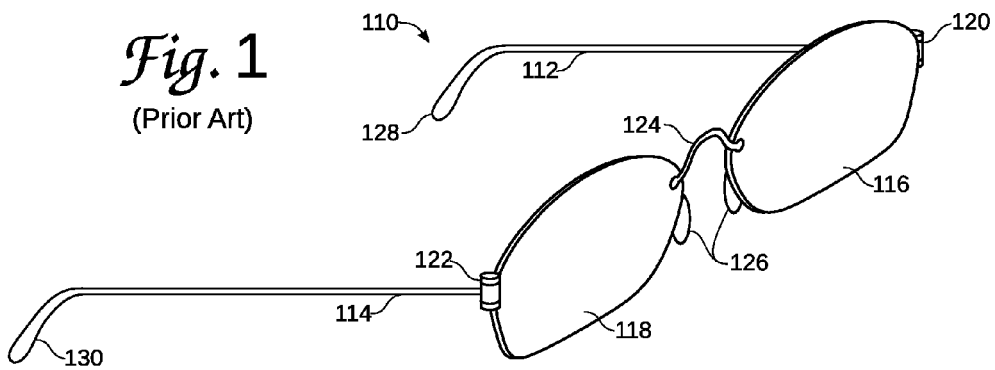
FIG. 1 is an illustration of an exemplary pair of frameless (rimless) traditional eyeglasses, as such eyeglasses are well known in the art.
Figure 2:
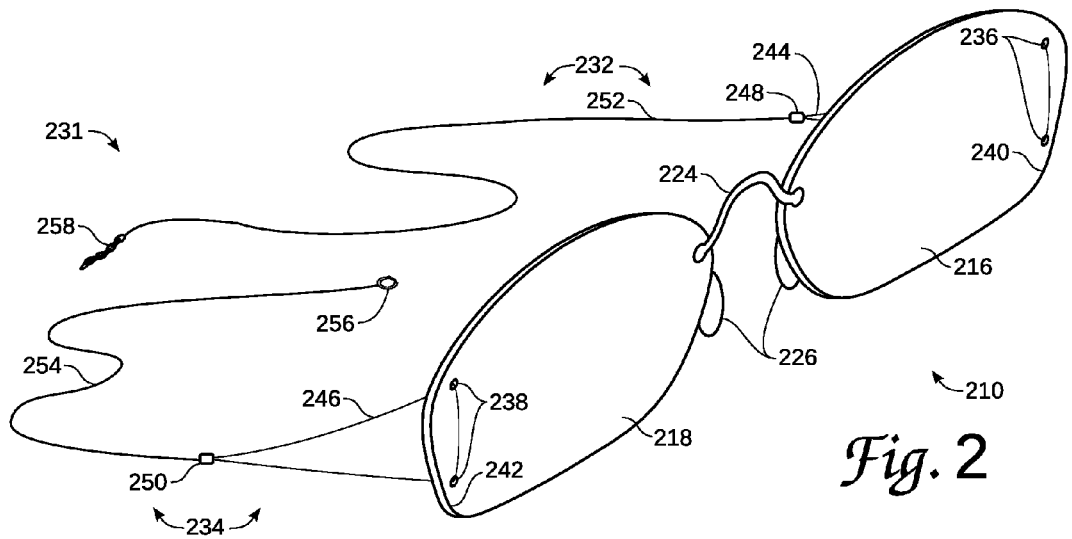
FIG. 2 is a schematic illustration of an exemplary pair of eyeglasses according to the invention, with an emphasis on functional components thereof.

As set forth above in the Background of the Invention, traditional eyeglasses are depicted in FIG. 1. By way of comparison and contrast, an exemplary embodiment of temple-bar-less eyeglasses 210 according to the invention is illustrated in FIG. 2.

Several components are similar between the traditional eyeglasses 110 and the temple-bar-less eyeglasses 210. Two lenses 216 and 218 are similar to those in the traditional eyeglasses 110, as are the nose bridge 224 and the nose pads 226.

As in traditional eyeglasses, the lenses 216 and 218 are fabricated in a traditional manner from standard materials used for eyeglass lenses, such as CR-39 plastic, polycarbonate, or even glass, formed and polished as usual and necessary for the proper corrective refraction characteristics (or the lack thereof, if the glasses are uncorrected safety glasses, sunglasses, or primarily aesthetic). The nose bridge 224 is generally metal, flexible enough to be bent slightly and adjusted as necessary to fit the wearer's facial features. The nose bridge 224 is affixed to each of the lenses 216 and 218 via attachment to a through-hole drilled into each of the lenses, or alternatively via a frame that surrounds (or partially surrounds) each of the lenses.

The nose pads 226, in the illustrated embodiment, are oblong silicone structures configured to allow the eyeglasses 210 to rest comfortably on the wearer's nose. The nose pads 226 are attached to the eyeglasses 210 via the nose bridge structure. In an alternative embodiment, the nose pads 226 may be affixed to the lenses directly or to a frame for the lenses.

However, the temple-bar-less eyeglasses have no hinges or temple bars. In their place, a flexible tether system 231 comprising a left tether portion 232 and a right tether portion 234 are present. As will be illustrated and described below, the flexible tether system retains the eyeglasses 210 on the wearer's head, comfortably and reliably, and with advantages not present in traditional eyeglasses.

Each of the lenses 216 and 218 defines two through-holes 236 and 238, in a generally vertical orientation, at each lateral edge 240 and 242 of the lenses 216 and 218. Each lens's set of through-holes is configured to receive flexible side loops 244 and 246 of a durable threadlike material. No hinge or other rigid structure is necessary at the lateral edges 240 and 242.

As illustrated in FIG. 2, each of the side loops 244 and 246 is threaded through the through-holes 236 and 238, respectively. A vertical extent of the side loops 244 and 246 extends along front surfaces of the lenses 216 and 218, while the remainder of the side loops 244 and 246 extend behind the lenses.

The side loops 244 and 246 each connect to couplers 248 and 250, and via the couplers 248 and 250 to head tether strands 252 and 254, respectively.

In the disclosed embodiment, the side loops 244 and 246 and the head tether strands 252 and 254 are formed from extruded polymer filaments or other threadlike materials. Preferably, transparent or translucent monofilament is used, for example nylon, a polyester (such as polyethylene terephthalate or PET), polyvinylidene fluoride (PVDF), or ultra-high-molecular-weight polyethylene (UHMWPE). PVDF and UHMWPE provide particular advantages in strength and abrasion resistance, and are considered to be more durable than other options.

Side loops and head tether strands formed from such materials may be thin and unobtrusive, and practically unnoticeable in the vertical extents that traverse the through-holes 236 and 238. Alternatively, colored or other intentionally visible material choices (for example, gold chain of the sort used in necklaces) may be selected as aesthetic choices. Of course, it will be recognized that combinations of the foregoing materials, or other materials (including but not limited to natural fibers, such as silk or cotton) may also be used. Elastic materials (such as neoprene) may be particularly advantageous when the eyeglasses 210 are to be worn during vigorous activity, such as exercise.

In the disclosed embodiment, each of the side loops 244 and 246 comprises a filament 5 to 20 cm in length (and preferably around 12 cm), and the through-holes 236 and 238 are generally 1 to 3 cm apart (advantageously around 1.5 cm). The through-holes are situated as close as practicable to the edge of the lenses 216 and 218, or in the frames if frames are present.

The couplers 248 and 250, in the disclosed embodiment, serve multiple purposes. In the disclosed embodiment, the couplers 248 and 250 are simple crimp connectors, and each receive both ends of the side loop material (forming loops from lengths of filament) and proximal ends of the two head tether strands 252 and 254. The side loops 244 and 246 are sized appropriately for the wearer, and the couplers are permanently crimped into place. Alternatively, the couplers 248 and 250 may be user-operable clamps, allowing the wearer to adjust the individual lengths of the side loops 244 and 246. The couplers 248 and 250 may also have some ornamental function, and may bear decorative markings.

Because the side loops 244 and 246 are affixed only to the couplers 248 and 250, they are relatively free to slide through the through-holes 236 and 238 in the lenses 216 and 218. This threading allows the eyeglasses 210 to be adjusted somewhat from a vertical orientation on the wearer's face.

In an alternative embodiment of the invention, the side loops may be affixed (e.g. cemented) to the through-holes to prevent such movement, or there may be provided eyelet structures on the lenses 216 and 218 where the side loops may be attached. If the side loops 244 and 246 are cemented or otherwise attached, the vertical extent of the side loops 244 and 246 extending in front of the lenses 216 and 218 may be removed, or even omitted.

As described above, eyeglasses according to the invention may be used for protective purposes, and when configured in such a way, it may be advantageous to provide protective shrouds around the edges of the lenses 216 and 218 to prevent airborne debris from reaching the wearer's eyes from the sides. Where such shrouds are provided, the eyeglasses may resemble goggles to some extent, and the side loops 244 and 246 may be attached to portions of the shrouds extending from the lenses, rather than to the lenses themselves.

At the opposite distal ends of the two head tether strands 252 and 254, a clasp structure allows the tether system 231 to be closed around the wearer's head. As illustrated, the right head tether strand 254 attaches to a spring-ring clasp 256, of the type ordinarily used in jewelry. The left head tether strand 252 attaches to a multi-link chain 258. The spring-ring clasp 256 may be coupled to any of the links in the multi-link chain 258, allowing for some adjustability in the overall length of the tether system 231. In alternative embodiments of the invention, different clasp structures may be used, such as lobster-claw clasps, magnetic barrel clasps, bar-and-ring toggles, permanently-connected elastic bands, or even simple knots. Many other alternatives are possible and may be applied within the scope of the present invention. The two head tether strands 252 and 254 may, in an embodiment, be replaced by a single piece of material appropriately sized for a particular wearer, possibly somewhat elastic to improve comfort.

In use, then, the eyeglasses rest on the wearer's nose via the nose pads 226, and the two head tether strands 252 and 254 rest atop the wearer's ears and connect behind the wearer's head. This provides a similar feel to traditional eyeglasses, as pressure is borne in primarily the same areas, but the light weight and flexibility of eyeglasses 210 according to the invention provide increased comfort.

As the two head tether strands 252 and 254 are clasped together behind the wearer's head, the side loops 244 and 246 extend into substantially triangular shapes, and the side loops 244 and 246 do not slide readily through the through-holes 236 and 238 when so extended. Accordingly, the triangular shapes provide some vertical stability to the eyeglasses 210 and tend to maintain the wearer's desired orientation.

It will be noted that several aspects of the eyeglasses 210 are particularly susceptible to customization. One example of such customization is illustrated in FIG. 3.

Figure 3:
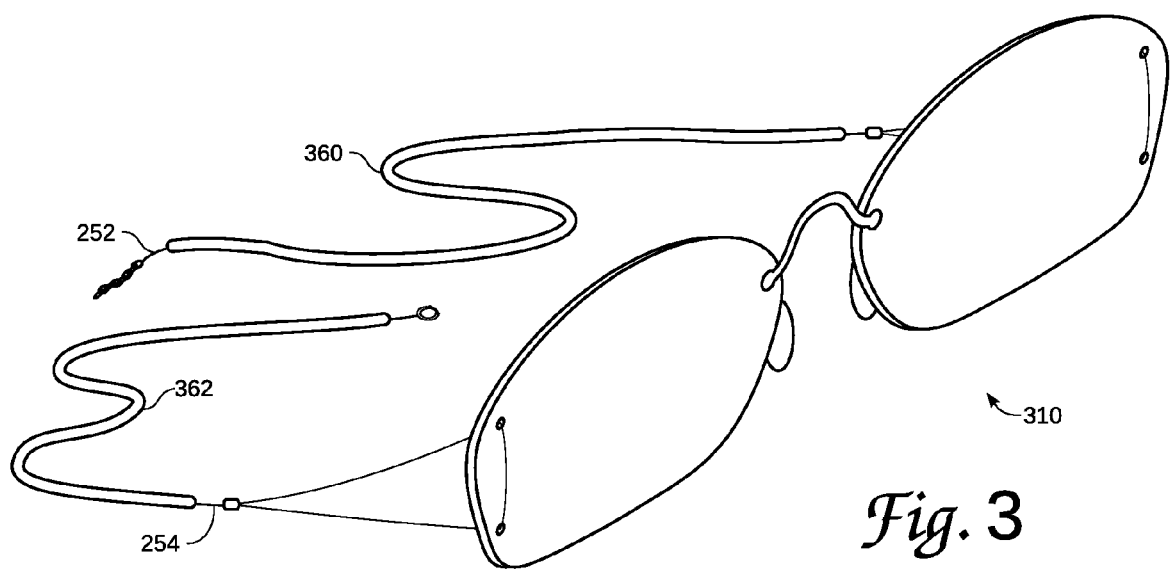
FIG. 3 is an illustration of an exemplary pair of eyeglasses according to the invention, bearing certain ornamental characteristics.

The eyeglasses 310 of FIG. 3 are functionally equivalent to the eyeglasses 210 of FIG. 2. However, it will be noted that the two head tether strands 252 and 254 have increased thickness in portions 360 and 362. This thickness may be provided by decorative beads threaded on the strands 252 and 254, or a fabric tube arranged around the strands. In an embodiment of the invention, the thickness arises out of a replacement material substituting for sections of the monofilament strands, such as neoprene or leather, if desired.

Where the transparency or translucency of monofilament are not required (for example, when the head tether strands 252 and 254 are threaded with beads), it is considered particularly advantageous to fabricate the head tether strands 252 and 254 from a reinforced material, such as nylon-coated stainless steel beading wire. The side loops 244 and 246 may also be made from a similar material.

The two head tether strands 252 and 254 having increased thickness, over at least a portion of their lengths, may provide increased comfort where the strands 252 and 254 contact the wearer's ears. They may also visibly and ornamentally improve upon the standard nearly-invisible monofilament, should the wearer wish to have that aesthetic characteristic.

In an embodiment of the invention, the customized head tether strand portions 360 and 362 may be user-replaceable, as in beads or tubes threadable over the strands 252 and 254. Or alternatively, the entire head tether strands 252 and 254 may be user-replaceable, by actuating an unlocking mechanism on the couplers 248 and 250, removing the undesired strands 252 and 254, and replacing them with alternates.

Figure 4:
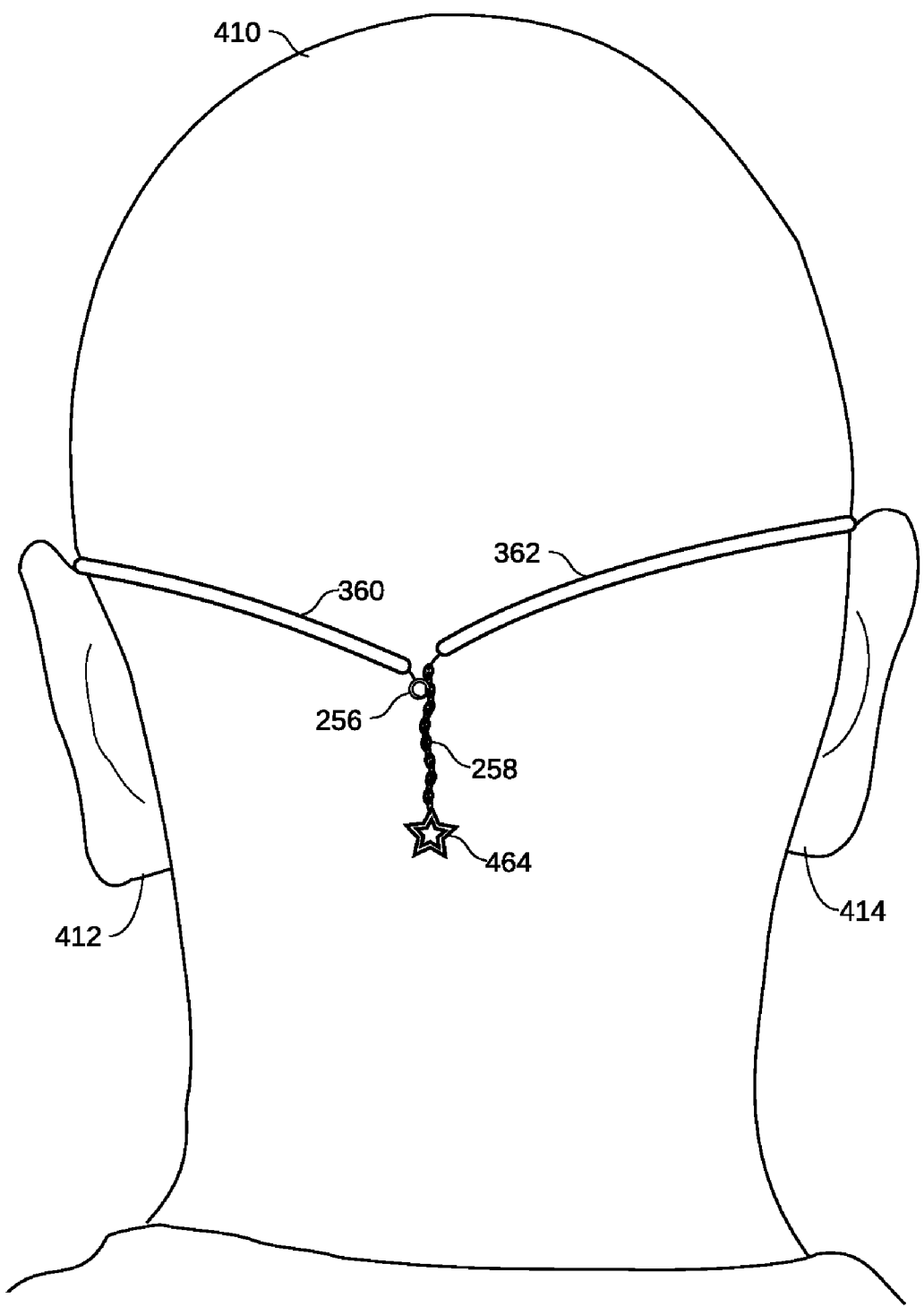
FIG. 4 is an illustration of an exemplary pair of eyeglasses according to the invention being worn, as seen from the rear of the wearer.

Additional ornamentation is illustrated in FIG. 4, which also explains the attachment mechanism of the head tether strands 252 and 254.

A typical wearer 410 has the eyeglasses 310 fastened in the typical wearing configuration. The thickened head tether strand portions 360 and 362 sit atop the wearer's ears 412 and 414, respectively. The spring-ring clasp 256 and multi-link chain 258 are connected together at a point that provides the wearer with comfort. As illustrated, to accomplish a looser fit (for example, if the eyeglasses 310 will be worn with the tether system 231 outside hair), the spring-ring clasp 256 may be affixed to a more distant link in the multi-link chain 258.

An ornament, specifically a charm 464, is also illustrated in FIG. 4. This optional feature may provide some additional aesthetic attraction to the eyeglasses 310, and also provides the functional advantage of providing the multi-link chain 258 with sufficient weight to avoid undesired movement when the wearer's head is moved around.

It should be observed that while the foregoing detailed description of various embodiments of the present invention is set forth in some detail, the invention is not limited to those details and temple-bar-less eyeglasses made according to the invention can differ from the disclosed embodiments in numerous ways. In particular, it will be appreciated that embodiments of the present invention may be employed in corrective or ornamental applications and may be configured in various manners that may depart in some details from the exemplary details set forth above. It should be further noted that functional distinctions are made above for purposes of explanation and clarity; specific structural distinctions in an apparatus according to the invention may not be drawn along the same boundaries. Hence, the appropriate scope hereof is deemed to be in accordance with the claims as set forth below.

What is claimed is:

1. Temple-bar-less eyeglasses comprising:
   a pair of lenses connected via a nose bridge;
   a pair of flexible side loops, each directly coupled vertically to a lateral edge of each of the pair of lenses at two points separated by at least about 1.0 cm; and
   a flexible head tether strand coupled to each of the pair of side loops;
   wherein each of the pair of side loops is pulled into a substantially triangular shape and the head tether strand extends substantially around the wearer's head when the temple-bar-less eyeglasses are worn.

2. The temple-bar-less eyeglasses of claim 1, wherein the lenses are refractive corrective lenses, tinted protective lenses, or safety glasses.

3. The temple-bar-less eyeglasses of claim 1, wherein the head tether strand comprises a left tether strand and a right tether strand.

4. The temple-bar-less eyeglasses of claim 3, wherein the left tether strand and right tether strand connect via a clasp mechanism to form the head tether strand.

5. The temple-bar-less eyeglasses of claim 4, wherein the clasp mechanism permits the head tether strand to be adjusted in length.

6. The temple-bar-less eyeglasses of claim 1, wherein the side loops are fabricated from a monofilament material.

7. The temple-bar-less eyeglasses of claim 6, wherein the monofilament material is selected from a group containing nylon, polyester, polyvinylidene fluoride, and ultra-high-molecular-weight polyethylene.

8. The temple-bar-less eyeglasses of claim 1, wherein the side loops are fabricated from an elastic material.

9. The temple-bar-less eyeglasses of claim 1, wherein each of the pair of lenses defines a pair of through-holes at its lateral edge, and wherein each loop of the pair of side loops is coupled to a respective one of the pair of lenses by threading the loop through the through-holes.

10. The temple-bar-less eyeglasses of claim 1, wherein the head tether strand is fabricated from a monofilament material.

11. The temple-bar-less eyeglasses of claim 1, wherein the monofilament material is selected from a group containing nylon, polyester, polyvinylidene fluoride, and ultra-high-molecular-weight polyethylene.

12. The temple-bar-less eyeglasses of claim 1, wherein the head tether strand is fabricated from an elastic material.

13. The temple-bar-less eyeglasses of claim 1, wherein the head tether strand includes at least one feature of ornamentation.

14. The temple-bar-less eyeglasses of claim 1, wherein at least one of the pair of side loops includes at least one feature of ornamentation.

15. The temple-bar-less eyeglasses of claim 1, wherein the head tether strand is removably coupled to the side loops, enabling replacement of the head tether strand with an alternative.

* * * * *